United States Patent [19]

Banks

[11] Patent Number: 4,885,083
[45] Date of Patent: Dec. 5, 1989

[54] SINGLE CHAMBER FILTER VESSEL

[76] Inventor: James V. Banks, 73 Rockford St., Brockton, Mass. 02401

[21] Appl. No.: 240,395

[22] Filed: Aug. 29, 1988

Related U.S. Application Data

[63] Continuation of Ser. No. 85,320, Aug. 10, 1987, abandoned, which is a continuation of Ser. No. 891,581, Aug. 1, 1986, abandoned.

[51] Int. Cl.$^4$ .............................................. B01D 29/08
[52] U.S. Cl. .................................... 210/108; 210/138; 210/274; 210/277; 210/289; 210/279
[58] Field of Search ............... 210/792, 793, 794, 795, 210/797, 798, 661, 741, 807, 108, 271, 274, 275, 138, 277, 289, 291, 279

[56] References Cited

U.S. PATENT DOCUMENTS

| | | | |
|---|---|---|---|
| 2,855,364 | 10/1958 | Roberts | 210/274 |
| 4,115,266 | 9/1978 | Oshima | 210/807 |
| 4,246,118 | 1/1981 | Tada et al. | 210/275 |
| 4,276,181 | 6/1981 | Cordier et al. | 210/274 |

Primary Examiner—Richard V. Fisher
Assistant Examiner—Christopher Upton

[57] ABSTRACT

A single chamber filter module containing a buoyant bed of filter particles through which the fluid to be filtered is passed in an upward direction through the bed so that the solids become trapped within the bed. The filtrate is withdrawn from the upper end of the module. Periodically, the filter bed is rehabbed by dispersing the bed, washing the entrapped solids from the particles and discharging the solids from the lower end of the module.

13 Claims, 2 Drawing Sheets

SINGLE CHAMBER FILTER VESSEL

This is a continuation of co-pending application Ser. No. 085,320 filed on Aug. 10, 1987, now abandoned, which is a continuation of Ser. No. 891,581, filed Aug. 1, 1986, now abandoned.

BACKGROUND OF THE INVENTION

In my pending application Ser. No. 755,466, filed July 16, 1985, there is shown a filter system wherein filtering is carried out on a continuous basis by dividing the filter vessel into a plurality of chambers disposed about a common center and, in succession, performing a filtering operation in each chamber followed by a purging operation. It is the purpose of this invention to provide a single chamber vessel in which filtering and rehashing can be accomplished without the complication of multiple chambers and to provide a filter which is less costly to manufacture and which requires less hardware in its operation.

SUMMARY OF THE INVENTION

A filter system comprising a vessel defining a chamber closed at the top and provided with an outlet at the bottom. A grid adjacent the top divides the chamber into a discharge chamber at the top above the grid and a filter chamber below the grid within which there is a bed of filter media. A grid adjacent the bottom provides for retaining the filter media. There is means in communication with the discharge chamber at the top to enable discharging filtrate from the discharge chamber, a feed conduit in communication with the filter chamber below the grid for delivering the fluid to be filtered at a predetermined flow rate into the filter chamber below the bed in its compacted condition for upward flow through the filter bed into the discharge chamber and from thence through the discharge conduit. There is means for rehabbing the system comprising means for closing the discharge conduit, means in communication with the discharge chamber above the grid for delivering air under pressure into the discharge chamber to displace the filter media downwardly in the filter chamber away from the grid at the top and to disperse the filter media, means for closing the feed conduit, means for showering the lower retaining grid, means for delivering backwash fluid into the dispersed filter media to strip the solids therefrom and drive the solids to the bottom and means at the bottom for drawing off the fluids and solids from the bottom.

Invention is also considered to reside in a method of backwashing a filter containing a floating filter bed of predetermined thickness comprised of buoyant filter bodies supported by their buoyancy against a retaining grid in a chamber provided at top and bottom with openings through which filtrate can be withdrawn from the top and solids can be removed from the bottom, a retaining grid at the bottom to prevent loss of filter media and an inlet opening situated between the top and bottom through which the fluid to be filtered can be introduced, the method comprising closing the opening at the top, opening the opening at the bottom, introducing air under pressure into the chamber at the top at a pressure to displace the fluid, solids and filter media downwardly toward the bottom, discontinuing the introduction of fluid to be filtered, introducing backwash fluid into the chamber above the downwardly-displaced bed so as to disperse and swirl the filter media to strip the solids from the media and propel the solids toward the bottom, showering the retaining grid at the bottom to clear the same for passage of solids and withdrawing the fluids and solids stripped from the filter media from the bottom.

The invention will now be described in greater detail with respect to the accompanying drawing wherein.

Figure 1:
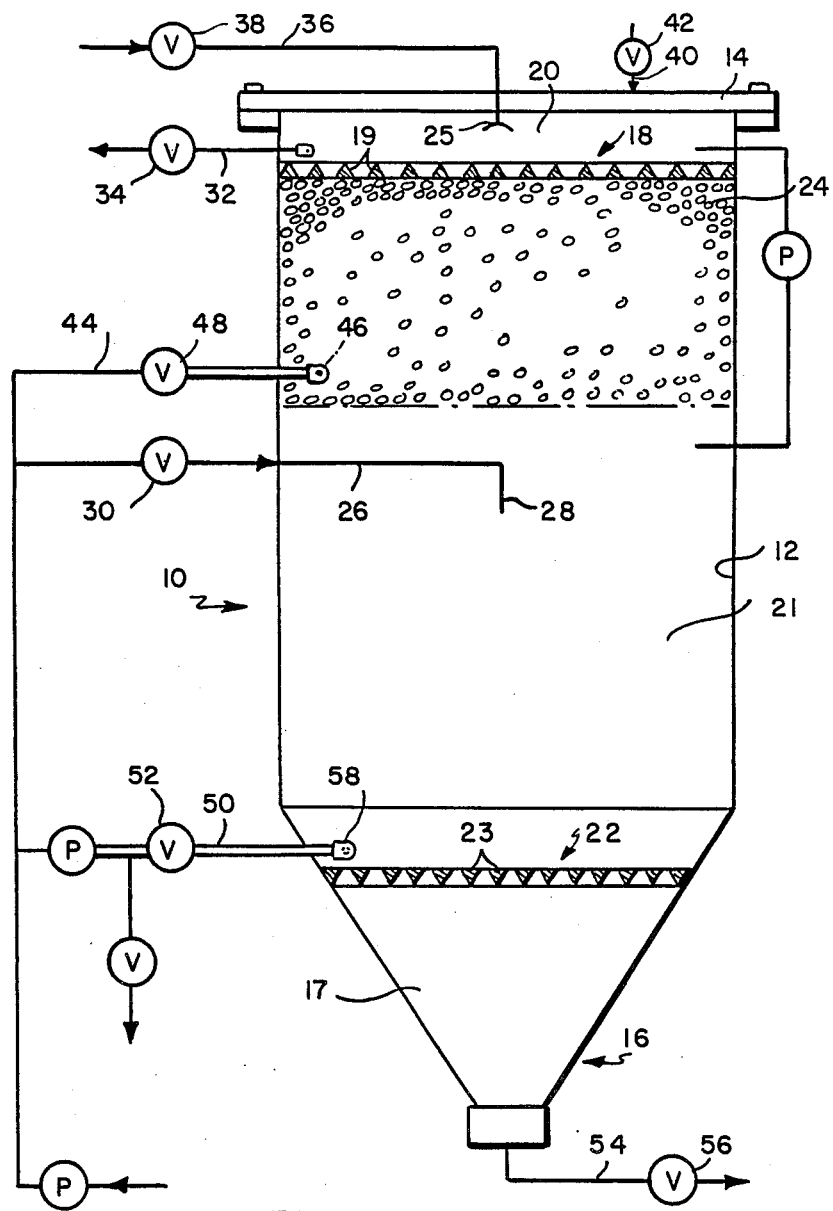
FIG. 1 is a diametrical, vertical section diagrammatically illustrating the filter chamber and plumbing.
Figure 3:
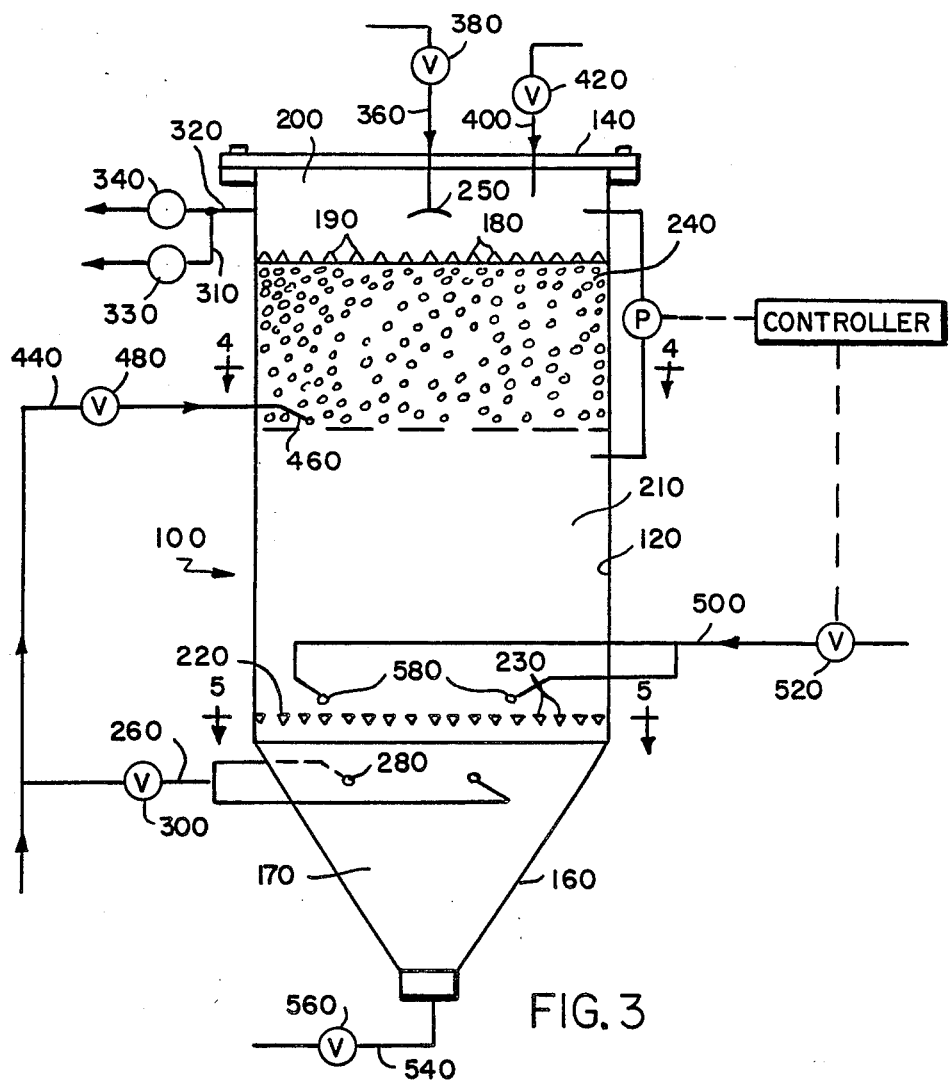
FIG. 3 is a diametrical, vertical section diagrammatically illustrating an alternative structure and control.

Referring to the drawings, FIGS. 1 and 3, there is shown a vessel 10 defining a chamber 12 of cylindrical cross section closed at the top by a cover plate 14 and provided at the bottom with a conical discharge chamber 16. There is a first grid 18 spaced downwardly from the top, defining at the top a discharge chamber 20 and a second grid 22 spaced upwardly from the bottom of the discharge chamber 16, defining a settling chamber 17. The space between the grids define a filter chamber 21. The respective grids 18 and 22 are comprised of spaced, parallel bars 19 and 23 of triangular cross section disposed with their apices disposed, respectively, upwardly at the top and downwardly at the bottom. A bed 24 of filter media is disposed between the grids comprised of buoyant articles sized to collect the solids effectively. The grid bars are spaced so as not to allow passage of the filter media therebetween.

A conductor 26 is provided for introducing the fluid to be filtered through the side of the vessel into the filter chamber 21 between the grids, the inner end 28 of which is downturned to cause the fluid to be directed downwardly toward the lower end of the chamber. The conductor 26 contains a shutoff valve 30. A discharge conductor 32 for filtrate is connected to the discharge chamber 20 above the grid 18 containing a shutoff valve 34. A conductor 36 delivers wash water to a shower head 25 above the retaining grid 18 and is provided with a shutoff valve 38. A conductor 40 is provided at the top of the vessel for introducing air under pressure to the chamber 20 and contains a shutoff valve 42. A conductor 44 is connected to the filter chamber 21 between the grids positioned above the conductor 26 provided with an end 46 so disposed as to provide clockwise swirling of the wash water as it is introduced into the vessel. The conductor 44 is provided with a shutoff valve 48. There is a conductor 50 provided with a shower nozzle 58 for delivering wash water into the filter chamber just above the grid 22. The nozzle 58 is disposed to impart clockwise swirling to the wash water and, hence, turbulence as the wash water enters during the backwashing operation. The conductor 50 is provided with a shutoff valve 52. At the lower end of the settling chamber 17, there is a discharge conductor 54 containing a shutoff valve 56.

A pressure transducer P is mounted to the side of the vessel in communication with the filter chamber 21 below the filter bed and with the discharge chamber 20 above the filter bed to detect a pressure drop through the bed caused by accumulation of solids in the bed. When the drop in pressure reaches a predetermined amount, rehabbing of the system is initiated. This may be done manually by manipulation of the several valves or automatically by suitable controllers response to the pressure drop.

As thus described, the apparatus is programmed to operate in the following manner. The valves 38, 42, 48, 52 and 56 are closed, the valves 30 and 34 are opened, the fluid to be filtered is introduced into the filter chamber 21 through the conductor 26 and the filtrate is withdrawn from the discharge chamber 20 through the conductor 32. The solids are stripped from the fluid by the bed of filter media 24 and, for the most part, become lodged in the filter bed. When the filter bed becomes loaded with solids, as indicated by a predetermined pressure drop between the discharge chamber 20 and the filter chamber 21, the filter bed is rehabbed. Rehabbing is effected by closing valves 30 and 34 and opening the valves 42, 48, 52 and 56. The rehabbing, as related above, may be done manually or by programming in a response to the pressure drop detected by the pressure transducer P. As a consequence, pressurized air is delivered into the discharge chamber 20 which forces the fluid in the vessel and the filter media downwardly in the filter chamber 21, dispersing the filter media 24, whereupon backwash feed is delivered into the filter chamber 21 through the conductor 24 above the downwardly-displaced bed, which disperses the bed, strips the solids from the filter media and forces the solids to the bottom. Fluid from both the conductor 50 and the conductor 44, together with the discharges solids, are withdrawn from the settling chamber 17 at the bottom. This backwashing procedure takes place without interrupting the delivery of feed into the filter vessel. When the backwashing has proceeded for a sufficient time to rehab the dispersed filter bed, the valves 38, 42, 48, 52 and 56 are closed and valves 30 and 34 reopened to resume filtering. The valve 38 is provided for supplying wash fluid for clearing the grids 18 of solids and may operate during each backwash or as required.

As thus structured and controlled, the filter system operates continuously by a continuous input of fluid and output of filtrate in the filtration mode and removing concentrated solids in the backwash mode. The system may be manually controlled and/or automatically controlled by the pressure drop across the bed to cycle the filtering and rehab systems at predetermined intervals.

Figure 2:
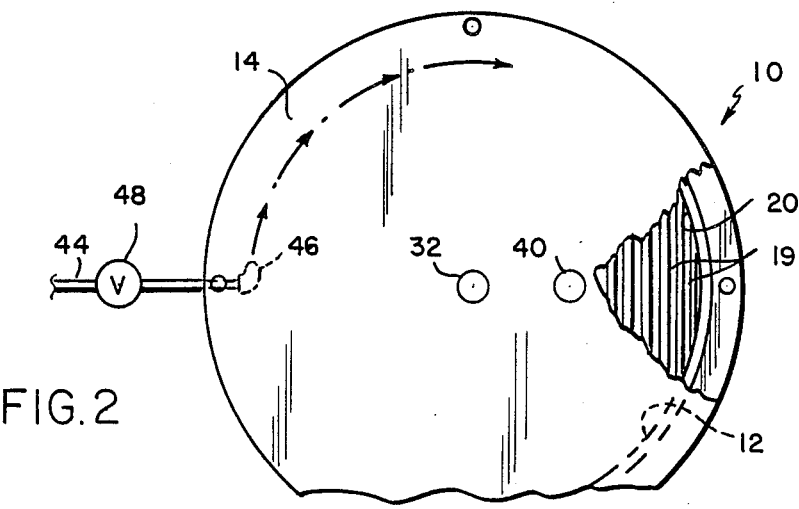
FIG. 2 is a plan view of FIG. 1 broken away in part to show the grid at the top.
Figure 4:
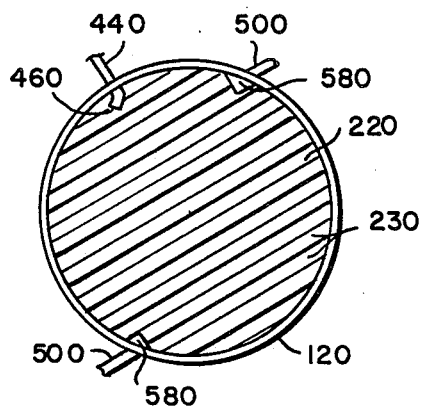
FIG. 4 is a diametrical section taken on the line 4—4 of FIG. 3.
Figure 5:
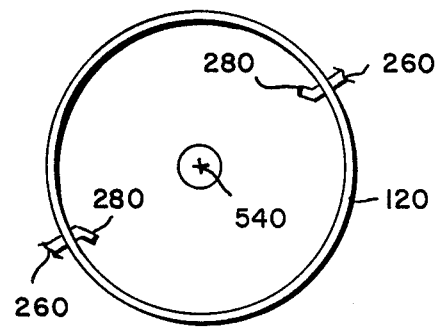
FIG. 5 is a diametrical section taken on line 5—5 of FIG. 3.

An important aspect of any well-designed filter is to maximize the quantity of filtrate removed while minimizing the pressure drop due to filtration. Extensive testing with the filter as shown in FIGS. 1 and 2 demonstrated the tendency of the fibers to collect at the media liquid surface interface, thus forming a filter mat. A filter mat is a very efficient collector of solids, but has a large resistance to flow so that the bed must be frequently backwashed in order to be effective. To extend the life of the filtering operation, an alternate filter structure is shown in FIGS. 3, 4 and 5 in which a filter mat is allowed to form (so as to provide an efficient collector of solids), but not at the expense of an exponential rise in pressure drop across the bed.

The apparatus shown in these figures provides for maintaining a fraction of the filter media suspended in the liquid beneath the filter bed early in the filtration mode. As filtration progresses, a filter mat forms at the liquid filter bed interface. By allowing the suspended filter media to be compacted in the bed, the filter bed becomes deeper, giving rise to a new liquid filter bed interface below the original, hence, the bulk of the solids collected from then on will be at the new interface and will not reach the original mat above.

The means to increase the filter bed during filtration mode is achieved by decreasing the degree of swirling that occurs below the filter bed. For a given filter design and operating conditions, a high degree of swirling will maintain a larger fraction of media suspended below the filter bed than a lower degree of swirling. When little or no swirling occurs, essentially all the filter media rises to form in the bed.

Thus, as designed, the amount of filter media suspended beneath the bed during the filtration mode can be controlled by controlling flow rate, inlet velocity and location of flow in the vessel while filtration is taking place. Fluid that enters the vessel below the lower grid has minimal effect on swirling since the swirling is damped out as the fluid passes through the grid. Therefore, for a given filter design, the nozzle location, nozzle angle and diameter are fixed so that the amount of suspended filter media below the filter bed during filtration mode can be controlled by the flow rate entering the vessel above the lower grid.

Referring to FIGS. 3, 4 and 5 which disclose structure very much like that shown in FIGS. 1 and 2, there is shown a vessel 100 defining a chamber 120 of cylindrical cross section closed at the top by a cover plate 140 and provided at the bottom with a conical discharge chamber 160. There is a first grid 180 spaced downwardly from the top, defining at the top a discharge chamber 200 and a second grid 220 spaced upwardly from the bottom of the discharge chamber 160, defining a settling chamber 170. The space between the grids defines a filter chamber 210. The respective grids 180 and 220 are comprised of spaced, parallel bars 190 and 230 of triangular cross section disposed with their apices, respectively, upwardly at the top and downwardly at the bottom. A bed 240 of filter media is disposed between the grids comprised of buoyant particles sized to collect the solids effectively. The grid bars are spaced so as not to allow passage of filter media therebetween. A conductor 260 is provided for introducing the fluid to be filtered through the side of the vessel into the discharge chamber 160 below the grid 230 provided with peripherally-spaced inner ends 280 which cause the fluid to be introduced into the chamber 160 below the grid. The conductor 260 contains a shutoff valve 300. A discharge conductor 320 for filtrate is connected to the discharge chamber 200 above the grid 180 and contains a shutoff valve 340. A second discharge conductor 310 is connected to the discharge conductor 320 and is provided with a shutoff valve 330. A conductor 360 delivers wash water to a shower head 250 above the retaining grid 180 and is provided with a shutoff valve 380. A conductor 400 is provided at the top of the vessel for introducing air under pressure to the chamber 200 and contains a shutoff valve 420. A conductor 440 is connected to the filter chamber 210 between the grids positioned above the conductor 260 provided with an end 460 so disposed as to provide clockwise swirling of the wash water as it is introduced into the vessel. The conductor 440 is provided with a shutoff valve 480. There is a conductor 500 provided with shower nozzles 580 for delivering wash water into the filter chamber just above the grid 220. The shower nozzles 580 are disposed to impart clockwise swirling to the wash water and, hence, turbulence as the wash water enters the backwashing operation—during the backwashing operation. The conductor 500 is provided with a shutoff valve 520. At the lower end of the settling chamber 170, there is a discharge conductor 540 containing a shutoff valve 560.

A pressure transducer P is mounted to the side of the vessel in communication with the filter chamber 210 below the filter bed and with the discharge chamber 200 above the filter bed to detect a pressure drop through the bed caused by accumulation of solids in the bed. When the drop in pressure reaches a predetermined amount, rehabbing of the system is initiated. This may be done manually be manipulation of several valves or automatically by suitable controllers responsive to the pressure drop. Desirably, a controller C is connected, respectively, to the pressure transducer P and to the valve 520.

This alternative filter structure operates very much like that disclosed in FIGS. 1 and 2, with the exception that the shower nozzles 580 operate during the entire cycle of operation. The flow through the conductor 500 is at a maximum during the backwash operation. It is then reduced following backwashing as the filter enters the filtration mode. The flow to the shower nozzles 580 is reduced further as the filtration mode proceeds so as to increase the amount of media compacting into the filter bed. The flow reduction can take place in several discrete step changes or done continuously. It can be performed by throttling down the flow in the conductor 500 that delivers fluid to the vessel above the lower grid 230 during the filtration mode.

Another aspect of this alternate filter design resides in valving the filtrate stream to separate low quality filtrate from high quality filtrate. Typically, the first 10 percent of the total filtrate removed immediately following the backwash is low quality filtrate. By separating this stream from the remaining 90 percent, a considerable improvement in the quality of the larger fraction is realized. There is provided means to separate the filtrate into two streams. Filtrate is removed from the vessel through the conductor 320. Two valves 330 and 340 are connected in parallel to the conductor 320. Following the backwash mode, the initial low quality filtrate is removed through the valve 330. At a predetermined time interval, the valve 340 is opened and the valve 330 closed, whereupon higher quality filtrate then passes through the valve 340.

As thus described, the filter illustrated in FIGS. 3 to 5 is programmed to filter in the following manner. The valves 330, 380, 420, 480 and 560 are closed, the valves 300 and 340 are open and the valve 520 is throttled. Fluid to be filtered enters the chamber through the conductor 260 and passes up through the grid 230. Solids for the most part are collected at the liquid filter bed interface. Liquid substantially free of solids passes through the bed and out through the conductor 320. In response to significant matting at the liquid filter bed interface, swirling will be reduced below the bed by reducing the flow through the conductor 500. The control module C is connected to the pressure transducer P and the valve 520 and is operable in response to a pressure drop across the bed to proportionally reduce the vale opening 520. This flow reduction buries the mat of solids with filter media, thus forming a deeper bed as the amount of suspended filter media is reduced. This process can take place at several step changes or continuously over the filtration mode. At a predetermined pressure drop across the bed, the filter goes back into the backwash mode. Backwashing the filter is accomplished by closing valves 300 and 340, opening valves 420, 480 and 560. The control valve 520 is adjusted from a maximum throttling setting (toward the end of the filtering mode) to a fully open setting for the backwash mode. When backwashing of the bed has taken place for a sufficient time to rehab the bed and remove the accumulated solids from the vessel, valves 420, 480 and 560 will close while valves 300 and 330 will open. The control valve 520 will be throttled. After a predetermined time in the filtration mode, valve 340 will open while valve 330 will close. The effect is to separate the low quality filtrate from the filtrate of higher quality. The lower quality filtrate passes through the valve 330 and the higher quality filtrate is removed through the valve 340. The control valve 520 is throttled throughout the filtration mode so as to gradually increase the amount of filter media compacted in the bed as filtration progresses.

Desirably, filter media of two or more different densities are employed in order to facilitate layering of successive filter mats within the filter bed. A combination of filter media having densities somewhat lighter (0.75 to 0.90 specific gravity) than that of the fluid being filtered and substantially equal to 0.90 to 1.0 and slightly heavier (1.0 to 1.05) than the fluid to be filtered.

It should be understood that the present disclosure is for the purpose of illustration only and includes all modifications or improvements which fall within the scope of the appended claims.

What is claimed is:

1. A filter vessel comprising means defining a closed chamber, a fluid discharge opening at the top of the chamber containing a fluid discharge valve, a solids discharge opening at the bottom containing a solids discharge valve, a first grid adjacent the top but spaced therefrom defining with the top a fluid discharge chamber, a second grid adjacent the bottom but spaced therefrom defining in conjunction with the first grid a filter chamber and with the bottom a solids discharge chamber, a bed of buoyant material disposed in the filter chamber between the first and second grids defining a filter bed, a first conductor for delivering fluid to be filtered into the filter chamber below the filter bed for flow upwardly through the filter bed, a second conductor located in the filter chamber for delivering wash fluid for rehabilitation to dislodge solids contained in the filter bed and means adjacent the upper side of the second grid for constantly clearing the solids deposited on the second grid to prevent accumulation of the solids thereon and promote passage of the solids through the second grid into the solids discharge chamber below the second grid.

2. A filter vessel according to claim 1 wherein said means for clearing the solids comprise a nozzle arranged above the second grid for delivering wash water into the vessel adjacent the upper side of the second grid and in a direction clockwise or counterclockwise to agitate the solids so that they pass through the second grid into the discharge chamber.

3. A filter vessel according to claim 1 comprising a solids discharge valve at the lower end of the discharge chamber, means for closing the fluid discharge valve when the pressure drop through the filter bed reaches a predetermined maximum, and means for opening the solids discharge valve below the second grid.

4. A filter vessel according to claim 3 comprising means above the first grid for delivering air under pressure into the fluid discharge chamber to displace the fluid in the vessel downwardly and to disperse the bed of buoyant material.

5. A filter vessel according to claim 3 comprising control means operable when the pressure drop through the filter bed reaches a predetermined minimum for reopening the fluid discharge valve, closing the solids discharge valve and closing the means for introducing wash water into the fluid discharge chamber.

6. A filter vessel according to claim 5 comprising first and second discharge valves at the top of the fluid discharge chamber operable successively to discharge low-quality filtrate and thereafter high-quality filtrate 7. Apparatus according to claim 5 comprising means discharging wash water on the upwardly-facing side of the second grid.

8. Apparatus according to claim 5 comprising a pressure transducer for detecting the pressure drop through the bed and a controller operable by the pressure transducer to on the one hand maximize the discharge of wash water above the lower grid and on the other hand to minimize the discharge of wash water above the lower grid.

9. A filter bed according to claim 1 comprising means operable after a predetermined time interval for rehabilitating the filter bed, comprising means operable to discontinue rehabilitation by reopening the fluid discharge valve, closing the solids discharge valve, reopening the means to deliver fluid to be filtered and closing the means for introducing wash water above and below the first grid.

10. A filter vessel comprising means defining a closed chamber, a fluid discharge opening at the top of the chamber containing a fluid discharge valve, a solids discharge opening at the bottom containing a solids discharge valve, a first grid adjacent the top but spaced therefrom defining with the top a fluid discharge chamber, a second grid adjacent the bottom but spaced therefrom defining in conjunction with the first grid a filter chamber and with the bottom a solids discharge chamber, a bed of buoyant material disposed in the filter chamber between the first and second grids defining a filter bed in the filter chamber, a first conductor for delivering fluid to be filtered into the solids discharge chamber below the second grid for flow upwardly through the second grid, through the filter chamber and through the bed therein and from thence into the fluid discharge chamber and means adjacent the upper side of the second grid for constantly clearing the solids deposited on the second grid to prevent accumulation of solids thereon.

11. A filter vessel according to claim 10 comprising means above the first grid for delivering air under pressure into the fluid discharge chamber to displace the fluid in the vessel downwardly and to disperse the bed of buoyant material.

12. A filter vessel according to claim 10 comprising a pressure transducer and controller for maximizing the flow of wash water adjacent the upper side of the lower grid during rehabilitation of the filter bed and means operable following complete rehabilitation and during removal of fluid through the discharge valve to either periodically or continuously reduce the discharge of wash water above the lower grid at intervals such as to minimize the discharge lever prior to rehabilitating the filter bed.

13. A filter vessel according to claim 10 comprising means for rehabilitating the filter bed, said means comprising means for closing the fluid discharge valve, means for opening the solids discharge valve, a valve for introducing fluid to be filtered, means for closing said valve, a valve for introducing air under pressure into the fluid discharge chamber and a valve for introducing wash water into the dispersed filter bed above and substantially parallel to the second grid to promote passage of solids therethrough.

* * * * *